US005435677A

United States Patent [19]

Gonzalez

[11] Patent Number: 5,435,677
[45] Date of Patent: Jul. 25, 1995

[54] METHOD OF LEVELING PALLET LOAD

[75] Inventor: Ricardo I. Gonzalez, Hendersonville, Tenn.

[73] Assignee: Shippers Paper Products Company, Glenview, Ill.

[21] Appl. No.: 163,541

[22] Filed: Dec. 9, 1993

[51] Int. Cl.⁶ .................. B61D 45/00; B63B 25/24
[52] U.S. Cl. .................... 410/156; 410/121; 410/154; 206/593; 206/814; 53/445; 53/447
[58] Field of Search ............ 410/154, 155, 156, 121; 206/593, 814, 386; 229/117, 117.03, 93; 414/789.5, 902, 799, 791.8, 791.9, 900, 902, 922; 53/139.5, 155, 445, 447, 472, 540

[56] References Cited

U.S. PATENT DOCUMENTS

| | | | |
|---|---|---|---|
| 2,609,136 | 9/1952 | Sider | 206/814 X |
| 2,616,361 | 11/1952 | Friesner | 53/540 X |
| 3,464,367 | 9/1969 | Latter | 410/155 |
| 3,678,865 | 7/1972 | Van Etten | 410/121 |
| 4,050,577 | 9/1977 | Boren | 206/386 X |
| 4,494,897 | 1/1985 | Rogers | 410/154 |
| B1 4,494,897 | 3/1993 | Rogers | 410/154 |
| 4,852,330 | 8/1989 | Carangelo | 53/447 X |
| 5,102,272 | 4/1992 | Woods et al. | 410/155 X |
| 5,135,109 | 8/1992 | Vergara | 206/386 |
| 5,144,897 | 9/1992 | Avery | 206/386 X |
| 5,205,410 | 4/1993 | Kuipers et al. | 206/386 |
| 5,287,963 | 2/1994 | Umemoto | 206/386 |
| 5,306,100 | 4/1994 | Higginbotham | 410/154 |

FOREIGN PATENT DOCUMENTS

| | | | |
|---|---|---|---|
| 1188286 | 9/1959 | France | 53/445 |
| 2231324 | 11/1990 | United Kingdom | 206/814 |

OTHER PUBLICATIONS

Buckhorn brochure entitled "Reusable Container Systems".

Primary Examiner—Michael S. Huppert
Assistant Examiner—Stephen Gordon
Attorney, Agent, or Firm—Schwartz & Weinrieb

[57] ABSTRACT

A method for leveling a pallet load includes providing at least two pallets and a predetermined combination of containers and void fillers. The combination of containers and void fillers are placed upon a first pallet that has generally flat, horizontal top and bottom surfaces. The combination of containers and void fillers defines a horizontal plane upon which a second pallet, which has generally flat top and bottom surfaces, is stacked.

20 Claims, 2 Drawing Sheets

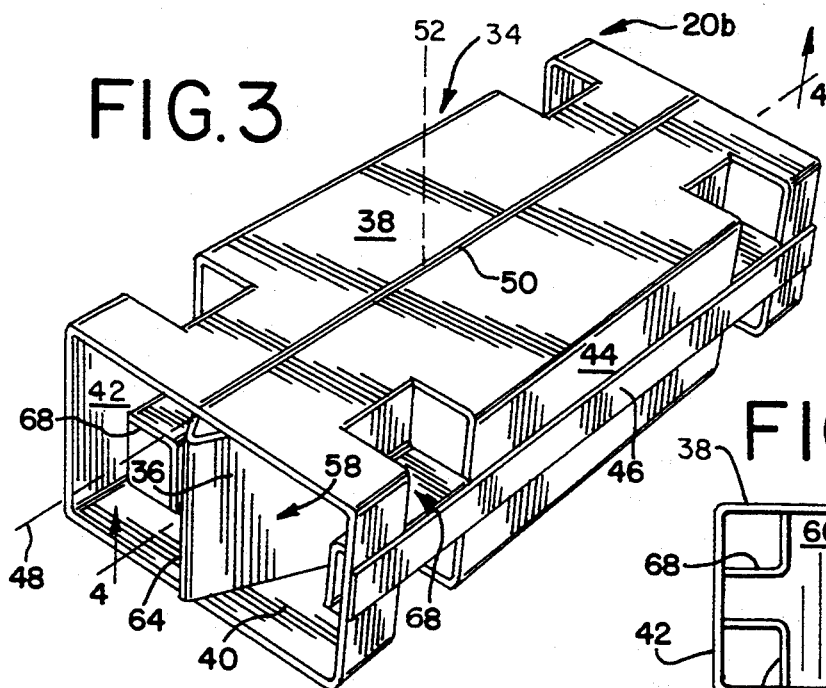
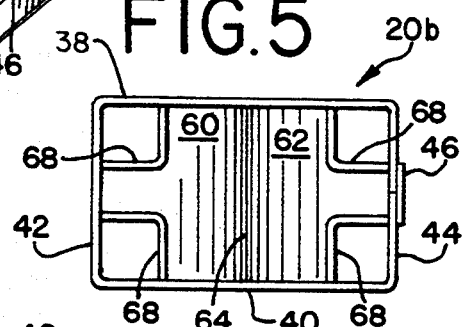
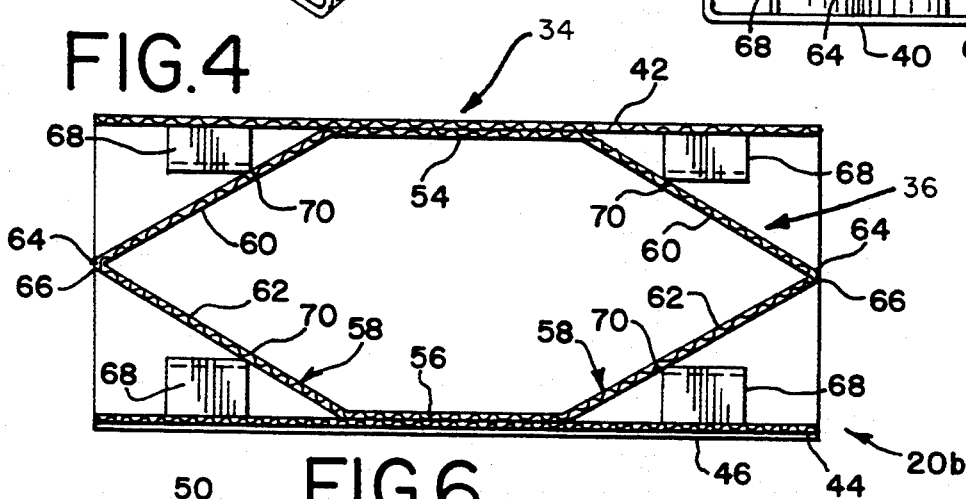
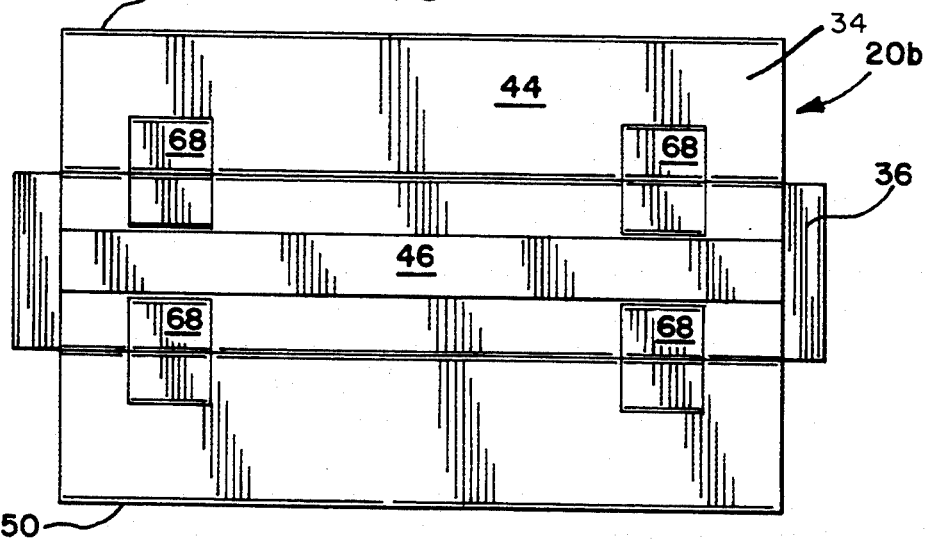

1

METHOD OF LEVELING PALLET LOAD

FIELD OF THE INVENTION

This invention is generally directed to a method of leveling a pallet load using a combination of containers and void fillers. More specifically, this disclosure illustrates a method of leveling a pallet load using a standard plastic container, and a void filler which may be expanded into a rigid configuration and collapsed into a generally flat configuration for storage.

BACKGROUND OF THE INVENTION

A typical prior art method for leveling a pallet load places a plurality of containers on a first pallet in a predetermined configuration and thereafter stacks a second pallet on top of the containers. Each container must be identical in height so that the second pallet can be stacked upon a level, horizontal plane which is defined by the containers. A container is placed at each corner of the pallet, and if the pallet is large, a container is additionally placed in the center of the pallet.

While this prior art method effectively levels a pallet load, a disadvantage occurs in that each container must be identical in height. However, in practice, in order to minimize storage space for goods in a warehouse, the goods are placed into containers of unequal heights and sizes. Under this prior art method, in order to ship the goods, the goods must be placed into containers of equal height. Thus, container space is often wasted since the goods do not completely fill the containers. Furthermore, often times a shipment of goods will not fill up all of the containers that are required to level the pallet under this method. Therefore, extra containers and container space are wasted.

The present invention is intended to overcome or minimize all of these problems, as well as to present several other improvements.

OBJECTS OF THE INVENTION

A general object of the present invention is to provide a method for leveling a pallet load that uses a predetermined combination of containers and void fillers.

Another object of the present invention is to provide a method for leveling a pallet load that uses containers and void fillers that are of unequal sizes and heights.

It is a specific object of the present invention to provide a void filler which is easily expanded into a rigid configuration and easily collapsed into a generally flat, collapsed configuration for storage.

SUMMARY OF THE INVENTION

Briefly, and in accordance with the foregoing, the present invention comprises a method for leveling a pallet load which includes providing a predetermined combination of containers and void fillers between two pallets. The combination of containers and void fillers is placed upon a first pallet that has generally flat, horizontal top and bottom surfaces. The combination of containers and void fillers defines a horizontal plane upon which a second pallet, which has generally flat top and bottom surfaces, is stacked.

The void fillers have an outer housing which includes a bottom wall, a top wall, and two side walls. The side walls extend upwardly from the bottom wall to the top wall. An inner core, which has a substantially diamond shaped configuration is disposed within the housing. The core includes foot members and side walls. The foot members are attached to the housing side walls. The core side walls include diagonal members which extend from each foot member to an apex and are joined at the apex.

The containers have a bottom wall and upstanding side walls having upper margins. The side walls extend upwardly from the bottom wall.

When a container is placed on the pallet, the container is disposed such that upper margins are horizontal. When the void filler is placed on the pallet, the top and bottom walls of the outer housing are horizontal and the side walls of said inner core are vertical.

BRIEF DESCRIPTION OF THE DRAWINGS

The organization and manner of the structure and operation of the invention, together with further objects and advantages thereof, may best be understood by reference to the following description, taken in connection with the accompanying drawings in which:

FIG. 3 is a perspective view of a void filler that can be used in the present method;

FIG. 4 is a cross-sectional view of the void filler in FIG. 3 along line 4—4;

FIG. 5 is an end elevational view of the void filler of FIG. 3; and

FIG. 6 is a top plan view of the void filler of FIG. 3 in a collapsed configuration.

DETAILED DESCRIPTION OF THE PREFERRED EMBODIMENT

Figure 1:
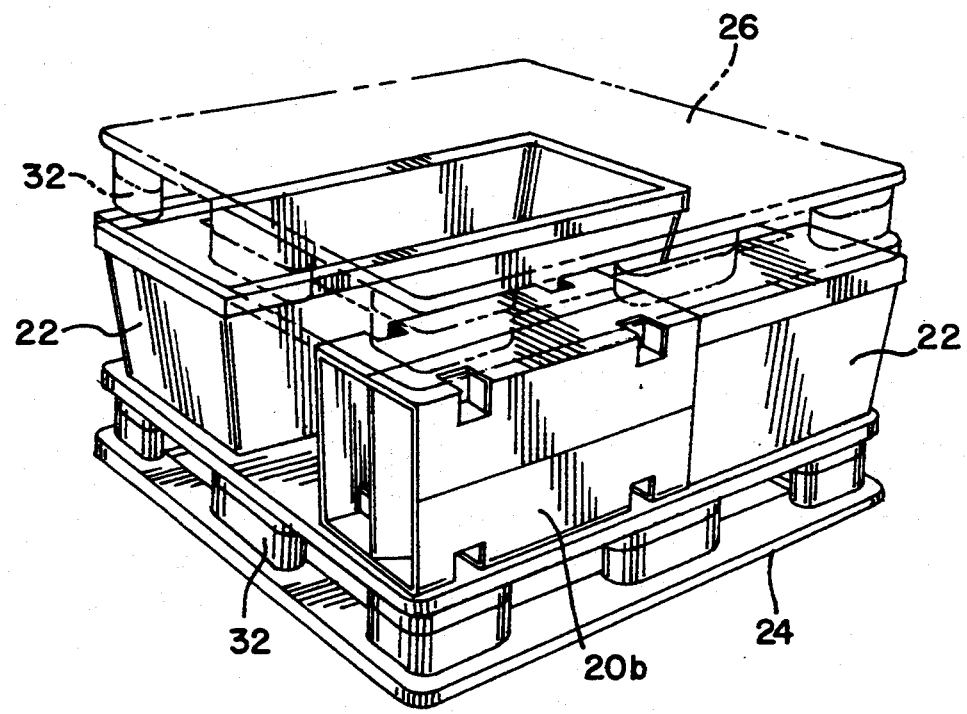
FIG. 1 is a perspective view of an arrangement of containers and a void filler stacked on a pallet with another pallet shown in phantom.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The apparatus for carrying out the novel method of the present invention is shown in the drawings. The method includes providing a combination of void fillers 20a, 20b and containers 22 on a first pallet 24 for leveling a second pallet 26 and the load thereby created. First, the apparatus for carrying out the method will be described in detail. Thereafter, the novel method will be described.

The pallets 24, 26 used in the present invention are of well-known construction and as such, will not be described in detail herein. Generally, each pallet is square or rectangular and has a flat upper surface 28 and a flat lower surface 30 and is made of a suitable material, such as wood or metal. Braces 32 are provided at spaced locations between the upper 28 and lower 30 surfaces. The upper 28 and lower 30 surfaces are horizontal when a load is placed thereon.

The containers 22 used in carrying out the novel method of the present invention are also of well-known construction and as such, will not be described in detail herein. Generally, each container 22 includes a bottom wall with upstanding side walls having upper margins extending upwardly therefrom. A top wall or lid engages the upper edges of the side walls and closes and seals the container 22. The container 22 holds goods therein. The container 22 may be made of any type of suitable rigid material, such as plastic or metal. The preferred container is a plastic Buckhorn ® container.

Figure 2:
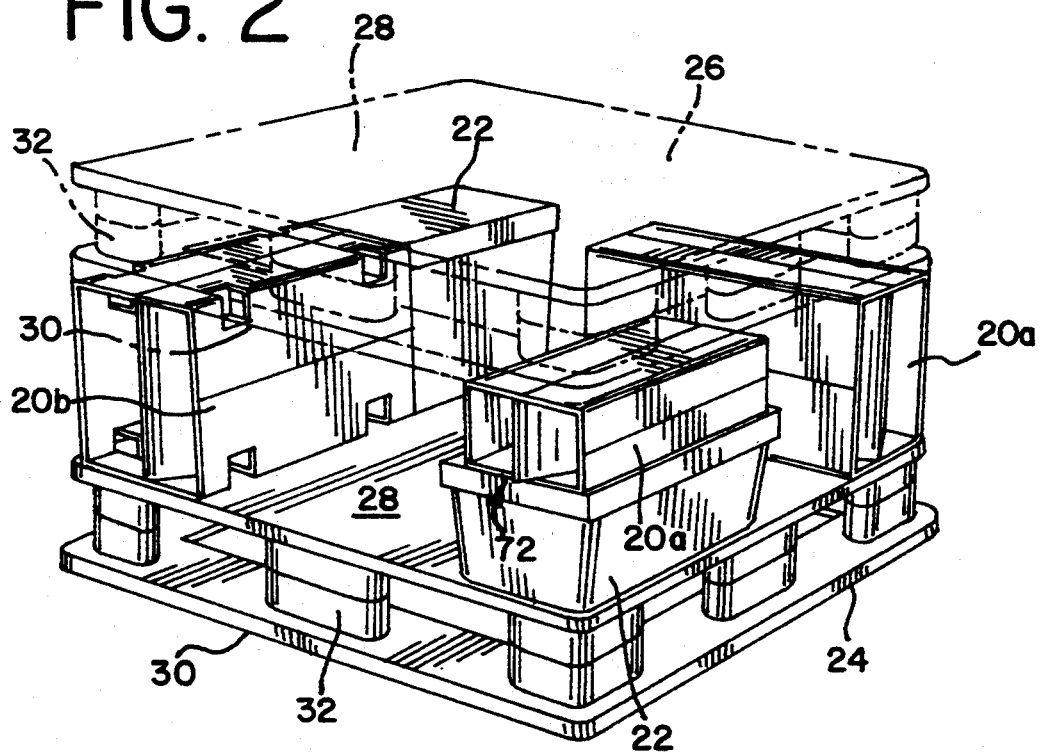
FIG. 2 is a perspective view of another arrangement of containers and void fillers stacked on a pallet with another pallet shown in phantom.

As illustrated in the FIGS. 1 and 2, two similar types of void fillers 20a, 20b are provided and may be used in the present invention. As shown in FIG. 2, one of these types of void fillers 20a is disclosed in U.S. Pat. No. 4,494,897 to Rogers and Reexam U.S. Pat. No. B1 4,494,897 to Rogers which discloures are incorporated herein by reference. The void filler 20a in Rogers is substantially similar to the void filler 20b shown in FIGS. 3–6 and described hereinbelow. The description below is explained in reference to the void filler 20b. However, the description below applies to the void filler 20a except for the differences noted. Also, reference is made to application Ser. No. 08/163,532 filed concurrently herewith issued as U.S. Pat. No. 5,378,096 on Jan. 3, 1995, and entitled, "Collapsible And Expandable Void Filler", which disclosed other void filler embodiments which may be used in the present invention.

As shown in detail in FIGS. 3–6, a void filler 20b which can be used in carrying out the novel method of the present invention is illustrated. The void filler 20b includes a generally tubular outer housing member 34 and a tubular inner core 36 which provides a tube within a tube construction. The void filler 20b is easily folded into a generally flat, collapsed configuration. Since the void filler 20b can be collapsed into a generally flat configuration, the void filler 20b does not occupy a large volume of space while stored.

Preferably, the housing 34 is made from paperboard and the core 36 is made from corrugated cardboard. The corrugated cardboard provides the void filler 20b with rigidity and high strength so the void filler 20b can support a pallet 26. Furthermore, since paperboard and corrugated cardboard are used in the void filler construction, the void filler 20b is lightweight.

The generally tubular outer housing member 34 includes a top wall 38, a bottom wall 40 and two side walls 42, 44. The housing 34 may be constructed from a single sheet of material which is folded about fold lines to create the top 38, bottom 40 and side walls 42, 44. The ends of the sheet are joined along a wall, shown as a side wall 44 in FIG. 3, by suitable means, such as adhesive, glue and the like. As shown, the ends of the sheet are joined by a strip of tape 46. It is to be understood that the ends of the single sheet may overlap. It is also to be understood that more than one sheet may be used to form the housing 34 with the sheets being attached to each other by suitable means, such as tape, adhesive, glue and the like. The tubular outer housing member 34 has a longitudinal axis, designated 48, which extends the length of the void filler 20b.

The side walls 42, 44 of the housing 34 extend upwardly from the bottom wall 40 to the top wall 38 when the void filler 20b is expanded. Each of the top 38 and bottom 40 walls are divided at approximately its midpoint into an upper and a lower portion by a scoring bead or an integrally formed score indentation 50, which extends along the length of each of the top 38 and bottom 40 walls. The score indentations 50 are applied by any well known method, such as an automatic roller or a manual device, and is intended not to pierce, cut or otherwise weaken the material but instead act to create a force which urges the top 38 and bottom 40 walls outwardly with respect to each other so as to collapse the housing 34 into a flattened configuration. The score indentations 50 allow the top 38 and bottom 40 walls to be easily folded outwardly by a user when it is necessary to collapse the void filler 20b for storage as described hereinbelow.

A central inner core member 36 is located in the interior or hollow portion provided by the tubular housing 34. The core 36 has a width which extends across a majority of the length of the housing 34 and has a longitudinal axis, designated 52, which, when the void filler 20b is expanded, is perpendicular to the longitudinal axis of the housing 34. The core 36 provides resistance to crushing and distortion when the void filler 20b is placed between two pallets 24, 26. The core 36 is a tubular member which is preferably substantially diamond shaped, as best shown in FIG. 4, when the void filler 20b is in an expanded configuration. The core 36 includes a first 54 and second 56 attaching foot members which are connected to each other by side walls 58. The first foot member 54 is attached to the interior of the side wall 42 of the housing 34 and the second foot member 56 is attached to the interior of the side wall 44 of the housing 34. The foot members 54, 56 may be attached to the housing 34 by a staple, brad or other mechanical connector, and preferably adhesive. The foot members 54, 56 securely hold the core 36 in position within the housing 34.

Each side wall 58 has two diagonal leg members 60, 62 which converge and are joined at an apex 64. The diagonal leg members 60, 62 extend from and connect each foot member 54, 56 in a zig-zag, angled fashion.

A scoring bead or an integrally formed score indentation 66 is formed at each apex 64 which allows the core 36 to bend easily at each apex 64 as the void filler 20b is collapsed for storage. Each score indentation 66 may be formed as described hereinabove.

The side walls 58 of the core 36 act as spacers and have a length which is sized to contact and space apart the housing top 38 and bottom 40 walls so as to prevent the housing top 38 and bottom 40 walls from collapsing inwardly when a pallet 26 is placed on top of the void filler 20b. The side walls 58 of the core 36 further act to rigidify and strengthen the housing 34 when the void filler 20b is in an expanded configuration so that the void filler 20b will not collapse under the load of the pallet 26.

The core 36 may be housed completely within the tubular housing 34 when the void filler 20b is in an expanded configuration as illustrated in FIG. 4. Alternatively, the core 36 may extend past the edges of the housing 34 as shown in FIG. 3. The diagonal leg members 60, 62 of the core 36 are not limited to the shown angles and may be constructed using a greater or lesser angle.

The core 36 may be constructed from a single sheet of material which is folded about fold lines to create the foot members 54, 56 and the side walls 58. The ends of the sheet are joined along a foot member by suitable means, such as tape, adhesive, glue and the like. It is to be understood that the ends of the single sheet may overlap. It is also to be understood that more than one sheet may be used to form the core 36 with the sheets being attached to each other by suitable means, such as tape, adhesive, glue and the like.

When the void filler 20b is in an expanded configuration, the top 38 and bottom 40 walls of the housing 34 are parallel with each other. The side walls 42, 44 and top wall 38 of the housing 34 are at approximately a 90° angle relative to each other and the side walls 42, 44 and the bottom wall 40 of the housing 34 are at approximately a 90° angle relative to each other.

A feature of the void filler 20b shown in FIGS. 3-6 which is not included in U.S. Pat. No. 4,494,897 to Rogers and Reexam U.S. Pat. No. B1 4,494,897 to Rogers is that the housing 34 includes collapsible wall portions 68 which collapse inwardly of the perimeter of the housing 34 and frictionally engage the diagonal leg members 60, 62 of the core 36. The friction between the collapsible wall portions 68 and the core 36 causes the void filler 20b to remain expanded by acting to counteract the outwardly urging force created by the score indentations 50 in the top 38 and bottom 40 walls of the housing 34.

As shown, eight collapsible wall portions 68 are illustrated although it is to be understood that a greater or fewer number of collapsible wall portions 68 may be used. The number of collapsible wall portions 68 necessary for use is dependent on the size of the void filler 20b. As shown, the collapsible wall portions 68 are separated into four upper wall portions and four lower wall portions. The wall portions 68 may be cut out of the walls 38, 40, 42, 44 of the housing 34 by conventional techniques, such as cutting.

Each upper wall portion 68 includes a section of the top wall 38 and a section of a side wall 42, 44 of the housing 34. Each lower wall portion 68 includes a section of the bottom wall 40 and a section of a side wall 42, 44. Each of the respective sections are aligned with each other and are continuous. When the wall portions 68 collapse inwardly of the perimeter of the housing 34, the sections are at approximately a 90° angle relative to each other.

Each section of the top wall 38 collapses inwardly to form a vertical wall of each upper wall portion 68 and each section of each side wall 42, 44 collapses inwardly to form a horizontal wall of each upper wall portion 68. Similarly, each section of the bottom wall 40 collapses inwardly to form a vertical wall of each lower wall portion 68 and each section of each side wall collapses 42, 44 inwardly to form a horizontal wall of each lower wall portion 68.

Each vertical wall is of a sufficient length such that the horizontal wall engages the diagonal leg member 60, 62 of the core 36. An edge 70 of each of the horizontal walls frictionally engages each diagonal leg member 60, 62 which causes the void filler 20b to remain in an expanded configuration. The horizontal walls are of a sufficient length such that a majority of the length of the core 36 is engaged. The interaction between the edges 70 of the horizontal walls and the leg members 60, 62 creates a frictional force which is greater than the outwardly urging force created by the score indentations 50 on the housing 34. Thus, when the wall portions 68 are collapsed, the void filler 20b remains in an expanded condition due to this frictional force.

To expand the void filler 20b, a user need only apply light hand pressure to the top 38 and bottom 40 walls of the housing 34 of the void filler 20b. When the top 38 and bottom 40 walls contact the core 36, the user collapses the wall portions 68 inwardly.

To collapse the void filler 20b, a user need only apply pressure to the side walls 42, 44 of the housing 34. The pressure exerted by the user overcomes the frictional force created by the interaction of the edges 70 of the collapsible wall portions 68 and the diagonal leg members 60, 62. Thereafter, the void filler 20b collapses along the score indentations 50, 66. The collapsible wall portions 68 will flatten as the void filler 20b collapses into a generally flat configuration.

The void fillers 20a, 20b may be easily assembled in the field by personnel having no specialized training. The operation of the void fillers 20a, 20b is self-explanatory. Also, because of the compact configuration, each collapsed void filler 20a, 20b may be easily transported when not in use or easily transported to a shipper. Furthermore, the void fillers 20a, 20b are reusable.

Now that the specifics of the necessary apparatus have been described, the novel method for leveling a pallet load will be described.

First, a predetermined configuration of containers 22 and void fillers 20a, 20b is provided and placed onto the top surface 28 of the first pallet 24. As shown in FIGS. 1 and 2, each container 22 and void filler 20a, 20b may be placed directly onto the top surface 28 of the first pallet 24. Alternatively, as shown in FIG. 2, a container/void filler 72 combination may be used. This combination is formed by placing a void filler, shown as 20a, on top of a container 22. In order to properly support the second pallet load 26, a container 22 or a void filler 20a, 20b or a container/void filler combination 72 must be placed at each corner of the first pallet. 24. If the pallets are large, a container 22 or a void filler 20a, 20b or a container/void filler combination 72 should also be placed in the center of the first pallet 24 in order to properly support the second pallet load 26.

When the void filler 20a, 20b is placed on the top surface 28 of the first pallet 24 or a container 22, the bottom wall 40 of the void filler 20a, 20b contacts the pallet 24 or container 22 and the top wall 38 of the void filler 20a, 20b contacts the bottom surface 30 of the second pallet load 26. The said walls 42, 44 of the housing 34 and the side walls 58 of the core 36 are disposed vertically. In this orientation, the void filler 20a, 20b will not collapse under the load of the second pallet 26 since the side walls 58 of the core 36 are vertical which prevents the void filler 20a, 20b from being crushed or distorted.

As illustrated, the void fillers 20a, 20b and containers 22 may be of different sizes and heights. However, in order for the second pallet 26 to be level, the top surfaces of the containers 22 and void fillers 20a, 20b and container/void filler combinations 72 must lie along the same horizontal plane. Thus, a combination of containers 22, void fillers 20a, 20b or container/void filler combinations 72 that creates this horizontal plane must be used. This combination depends on the size of the containers employed for the storage of the goods.

Under this method, multiple pallets can be stacked on top of each other with container 22, void fillers 20a, 20b or container/void filler combinations 72 separating the pallet loads. This novel method presents a distinct advantage in that since the void fillers 20a, 20b fill up any extra space between the pallets 24, 26 due to non-identical containers 22, container space and extra containers are not wasted when shipping a load.

While embodiments of the present invention are shown and described, it is envisioned that those skilled in the art may devise various modifications of the present invention without departing from the spirit and scope of the appended claims. The invention is not intended to be limited by the foregoing disclosure.

The invention claimed is:

1. A method for leveling a pallet load, comprising the steps of:

providing at least one collapsible and expansible void filler which is collapsible to a collapsed, inoperative state and expansible to an expanded, operative state, and which comprises an outer housing and an inner core member disposed within said outer housing, and means operative upon said collapsible and expansible void filler for preventing collapse of said at least one collapsible and expansible void filler from said expanded, operative state to said collapsed, inoperative state under load conditions;

placing a predetermined combination of at least one cargo container at a first location upon a first pallet, and said at least one collapsible and expansible void filler at a second location upon said first pallet such that upper surface portions of said at least one cargo container and said at least one collapsible and expansible void filler together define a substantially level, horizontal plane defining a support surface; and placing a second pallet upon said support surface defined by the combination of said upper surface portions of said at least one cargo container and said at least one collapsible and expansible void filler such that said second pallet can be supported in a substantially level, horizontal mode by said at least one cargo container and said at least one collapsible and expansible void filler.

2. A method as defined in claim 1, wherein:
said at least one container and said at least one void filler are of the same height.

3. A method as defined in claim 1, further including the step of:
placing a second void filler on top of a second cargo container disposed at a third location upon said first pallet so as to form a container/void filler combination at said third location which has the same height as said at least one void filler disposed at said second location and said at least one cargo container disposed at said first location.

4. The method as set forth in claim 1, further comprising the steps of:
fabricating said outer housing of said at least one void filler from paperboard; and
fabricating said inner core of said at least one void filler from corrugated cardboard.

5. The method as set forth in claim 1, wherein said step of providing said at least one void filler with said means for preventing collapse of said at least one void filler comprises the step of:
providing said outer housing with collapsible wall portions for collapsing inwardly of said outer housing so as to frictionally engage said inner core.

6. A method for leveling a pallet load, comprising the steps of:
providing at least one void filler comprising an outer housing including a bottom wall, a top wall, and two side walls extending upwardly from said bottom wall of said outer housing toward said top wall of said outer housing; and an inner core, having a substantially diamond-shaped configuration, disposed within said outer housing for preventing collapse of said outer housing and said at least one void filler under load conditions, and including foot members and side walls wherein said foot members are attached to said side walls of said outer housing, and said side walls of said inner core comprise diagonal members extending from each foot member and being joined to each other at an apex;

providing first and second pallets, each of said pallets having generally flat, horizontal top and bottom surfaces;

placing a predetermined combination of at least one cargo container at a first location upon said first pallet, and said at least one void filler at a second location upon said first pallet such that upper surface portions of said at least one cargo container and said at least one void filler together define a substantially level, horizontal plane defining a support surface spaced above said first pallet; and placing said second pallet upon said support surface defined by said horizontal plane formed by the combination of said upper surface portions of said at least one cargo container and said at least one void filler such that said second pallet can be supported in a substantially level, horizontal mode by said predetermined combination of said at least one cargo container and said at least one void filler.

7. A method as defined in claim 6, wherein:
said at least one container and at least one said void filler are of the same height.

8. A method as defined in claim 6, further including the step of:
placing a second void filler on top of a second container disposed at a third location upon said first pallet so as to form a container/void filler combination at said third location which has the same height as said void filler disposed at said second location upon said first pallet and said at least one container disposed at said first location upon said first pallet.

9. A method as set forth in claim 6, wherein:
said at least one void filler is disposed upon said first pallet such that said top and bottom walls of said outer housing are horizontal and said side walls of said inner core are vertical.

10. The method as set forth in claim 6, further comprising the step of:
fabricating said at least one void filler as a collapsible and expansible void filler.

11. The method as set forth in claim 10, further comprising the step of:
fabricating said outer housing of said at least one void filler from paperboard; and
fabricating said inner core of said at least one void filler from corrugated cardboard.

12. The method as set forth in claim 10, further comprising the step of:
providing said at least one void filler with means for preventing collapse of said at least one void filler once said at least one void filler has been expanded to its expanded condition.

13. The method as set forth in claim 12, wherein said step of providing said at least one void filler with said means for preventing collapse of said at least one void filler comprises the step of:
providing said outer housing of said at least one void filler with collapsible wall portions for collapsing inwardly of said outer housing of said at least one void filler so as to frictionally engage said inner core of said at least one void filler.

14. A method for leveling a pallet load, comprising the steps of:
providing at least one collapsible and expansible void filler which is collapsible to a collapsed, inoperative state and expansible to an expanded, operative state, and which comprises an outer housing and an inner core member disposed within said outer housing, and means operative upon said collapsible and expansible void filler for preventing collapse of said at least one collapsible and expansible void filler from said expanded, operative state to said collapsed, inoperative state under load conditions;

providing first and second pallets, wherein each one of said pallets has substantially flat, horizontal top and bottom surfaces;

placing a predetermined combination of one cargo container at a first location upon said first pallet, a second cargo container at a second location upon said first pallet, and said at least one void filler on top of said second cargo container disposed at said second location of said first pallet so as to form a container/ void filler combination at said second location of said first pallet which has the same height as said one cargo container disposed at said first location upon said first pallet such that upper surface portions of said one cargo container and said container/void filler combination together define a substantially level, horizontal plane defining a support surface spaced above said first pallet; and placing said second pallet upon said support surface defined by said horizontal plane formed by said combination of said upper surface portions of said one cargo container and said container/ void filler combination such that said second pallet can be supported in a substantially level, horizontal mode by said predetermined combination of said one cargo container and said container/void filler combination.

15. The method as set forth in claim 14, further comprising the steps of:

fabricating said outer housing of said at least one void filler from paperboard; and fabricating said inner core member of said at least one void filler from corrugated cardboard.

16. The method as set forth in claim 14, wherein said step of providing said at least one void filler with said means for preventing collapse of said at least one void filler comprises the step of:

providing said outer housing with collapsible wall portions for collapsing inwardly of said outer housing so as to frictionally engage said inner core member.

17. A method for leveling a pallet load, comprising the steps of:

providing at least one void filler comprising an outer housing including a bottom wall, a top wall, and two side walls extending upwardly from said bottom wall of said outer housing toward said top wall of said outer housing; and an inner core, having a substantially diamond-shaped configuration, disposed within said outer housing for preventing collapse of said outer housing and said at least one void filler under load conditions, and including foot members and side walls wherein said foot members are attached to said side walls of said outer housing, and said side walls of said inner core comprise diagonal members extending from each foot member and being joined to each other at an apex;

providing first and second pallets wherein each one of said pallets has substantially flat, horizontal top and bottom surfaces;

placing a predetermined combination of one cargo container at a first location upon said first pallet, a second cargo container at a second location upon said first pallet, and said at least one void filler on top of said second cargo container disposed at said second location upon said first pallet so as to form a container/void filler combination at said second location upon said first pallet which has the same height as said one cargo container disposed at said first location upon said first pallet such that upper surface portions of said one cargo container and said container/ void filler combination together define a substantially level, horizontal plane defining a support surface spaced above said first pallet; and placing said second pallet upon said support surface defined by said horizontal plane formed by said combination of said upper surface portions of said one cargo container and said container/ void filler combination such that said second pallet can be supported in a substantially level, horizontal mode by said predetermined combination of said one cargo container and said container/void filler combination.

18. The method as set forth in claim 17, further comprising the steps of:

fabricating said outer housing of said at least one void filler from paperboard; and fabricating said inner core of said at least one void filler from corrugated cardboard.

19. The method as set forth in claim 17, further comprising the steps of:

fabricating said at least one void filler as a collapsible and expansible void filler which is collapsible to a collapsed, inoperative state and expansible to an expanded, operative state; and providing said at least one void filler with means for preventing collapse of said at least one void filler to said collapsed state once said at least one void filler has been expanded to said expanded state.

20. The method as set forth in claim 19, wherein said step of providing said at least one void filler with said means for preventing said collapse of said at least one void filler comprises the step of:

providing said outer housing with collapsible wall portions for collapsing inwardly of said outer housing so as to frictionally engage said inner core.

* * * * *